United States Patent Office 3,106,828
Patented Oct. 15, 1963

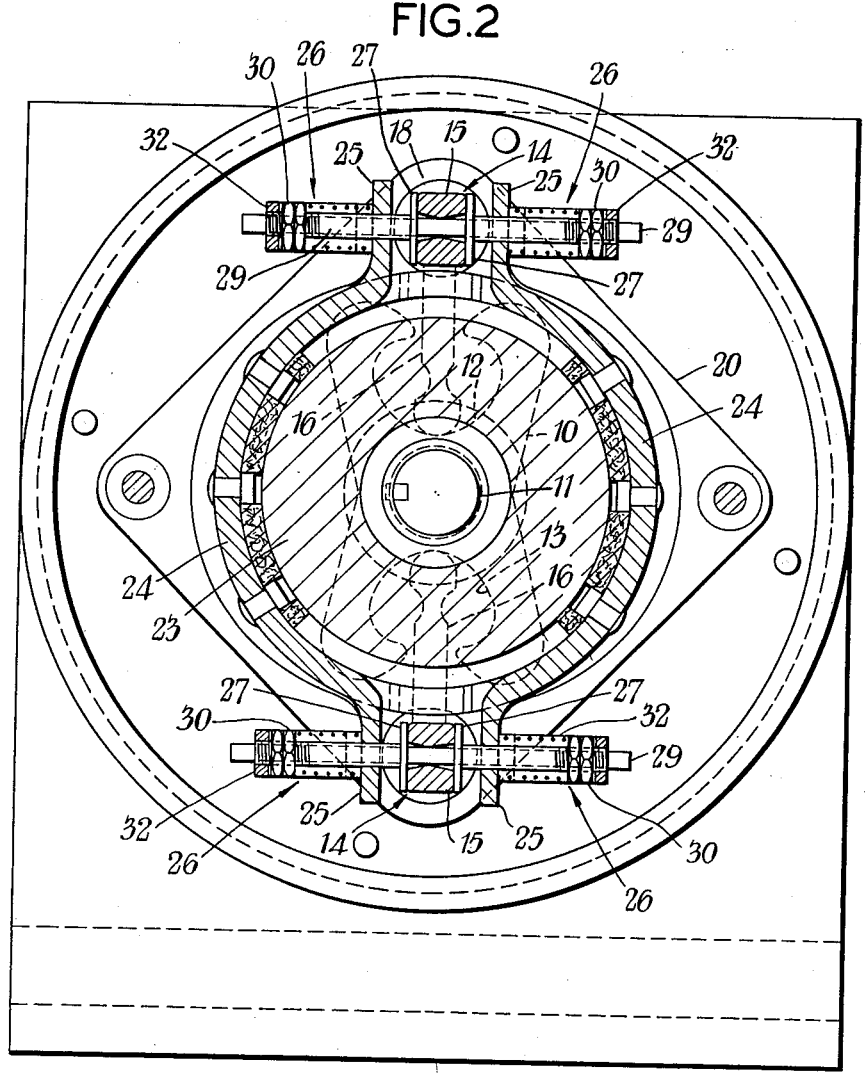

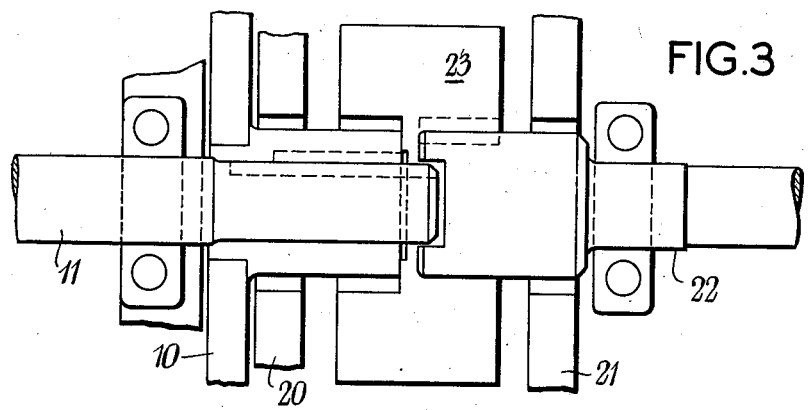
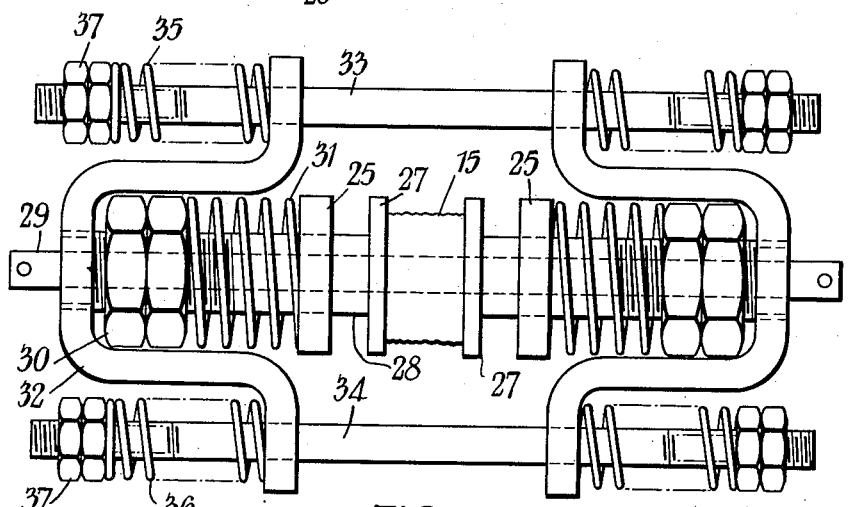
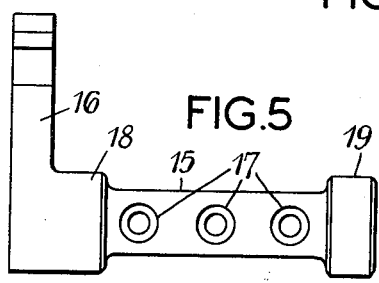
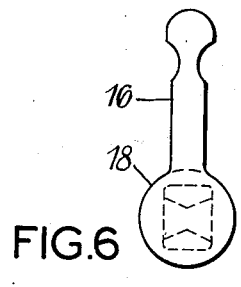

3,106,828
DRIVE TRANSMITTING MECHANISMS
Arthur Thomas Charles Burrows, Stevenage, England, assignor to Geo. W. King Limited, Stevenage, England, a British company
Filed July 17, 1962, Ser. No. 210,458
Claims priority, application Great Britain July 20, 1961
5 Claims. (Cl. 64—30)

This invention relates to drive transmitting mechanisms and is concerned more particularly although not necessarily exclusively with such mechanisms as are employed for traversing hoists, cranes or the like.

It is the chief object of the invention to provide means for incorporation in drive units employed for imparting traverse motion to pulley blocks, cranes and the like which means will be effective to ensure smooth acceleration and retardation under all condition of operation and thereby substantially to eliminate or materially to decrease load swing or sway.

According to the invention there is interposed between axially aligned driving and driven shafts a transmission mechanism which incorporates a friction clutch device comprising a drum or the like drivingly coupled to one of the shafts and friction gripping means associated with the other of said shafts and adapted frictionally to engage the drum or the like, there being means adapted automatically to control the frictional engagement between said gripping means and said drum or the like in such a manner that the torque transmitted to the driven shaft will be at a minimum on initial rotation of the driving shaft and will progressively increase towards a maximum as the speed of the driven shaft approaches that of the driving shaft whereby a smooth acceleration of the driven shaft will be obtained.

In order that the said invention may be clearly understood and readily carried into effect the same will be hereinafter more fully described with reference to the acompanying drawings in which:

FIGURE 2 is a view on the line 2—2 of FIGURE 1,

FIGURE 3 is a diagrammatic view illustrating the layout of certain parts of the mechanism, FIGURE 4 illustrates on a larger scale one of the spring assemblies incorporated in the embodiment shown in FIGURES 1 and 2, FIGURES 5 and 6 are side and end elevational views respectively of a component hereinafter referred to as an operating lever.

Figure 1:
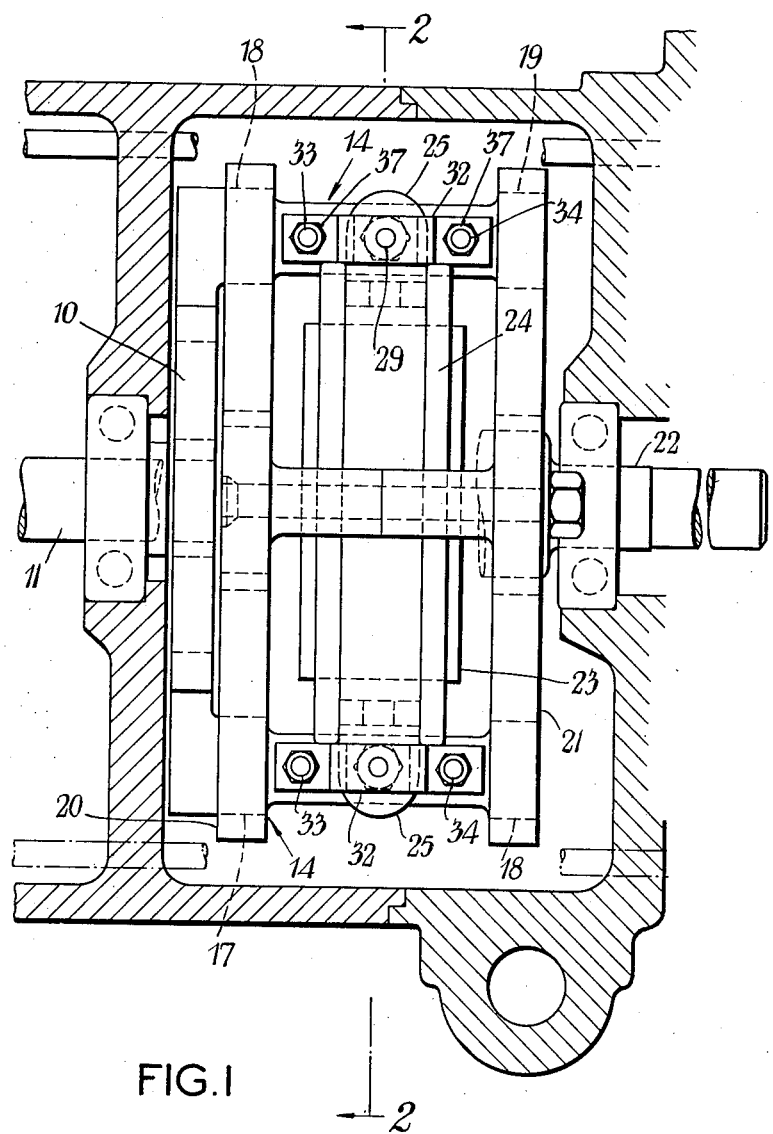
FIGURE 1 is a side elevational view of a drive transmission mechanism.

Referring now to the drawings 10 denotes a cam element which is keyed to the outer end of a driving shaft 11 e.g. the shaft of an electric motor. The cam element 10 which will rotate with the shaft 11 is formed with two cam surfaces 12 and 13 which are disposed in diametrically opposed relationship with respect to said shaft. Co-operating with each of the cam surfaces is a cranked operating lever designated generally by 14, each such lever the form of which is clearly illustrated in FIGURES 5 and 6, comprising a shaft portion 15 of generally rectangular section and a radially directed arm 16 having a ball shaped end adapted to cooperate with the appropriate cam surface 12 or 13. As will be seen the shaft portion 15 which is formed with three profiled apertures 17 the purpose of which will be hereinafter made apparent, is also formed with two spaced collars 18, 19 whereby the lever may be journalled for pivotal or angular motion in the end plates 20, 21 of a cage or carrier. The two levers 14 are displaced through 180° with respect to each other with the longitudinal axes of the respective shaft portions 15 parallel to the axis of the driving shaft 11 while the cage or carrier in which they are mounted is so journalled as to be capable of free rotation about the aligned axes of said shaft 11 and a driven shaft 22, the arrangement being such that in operation of the mechanism said cage or carrier will rotate with the aforesaid shafts.

Keyed to the driven shaft 22 is a drum 23 with which a pair of arcuate brake shoes 24 are adapted to cooperate such shoes being provided at their ends with lugs or extensions 25 between which the shaft portions 15 of the levers 14 are disposed. Spring assemblies designated generally by 26 in FIGURE 2 are arranged to cooperate with the lugs or extensions 25 of the brake shoes 24, the arrangement being such that the latter will be spring loaded and normally resiliently urged into frictional engagement with the drum 23.

As will be clearly seen from FIGURE 4 which shows one complete spring assembly consisting of two sets of springs, the shaft portion 15 of each operating lever is actually disposed between flanges or collars 27 formed one on each of two sleeve elements 28 which are slidable on a rod 29 extending through the centre aperture 17 in the shaft portion 15 of the operating lever. Each sleeve element 28 is threaded at its outer end and carries lock nut assembly 30 whereby the tension on a coil spring 31 interposed between said assembly 30 and the lug or extension 25 of the appropriate brake shoe, may be adjusted. Each sleeve element 28 is also threaded into a bridge piece 32 such bridge piece serving to support rods 33, 34 in such a manner that relative movements between said bridge pieces and said rods is permissible. The rods 33, 34 which extends through the appropriate apertures 17 in the shaft portion 15 of the operating lever serve to support springs 35, 36 such springs bearing at one end against lock nut assemblies 37 on said rods and at the other against the outer face of the bridge piece. It will be appreciated that on angular movement of the shaft portion 15 of the operating lever, such movement resulting from the contact of the arm 16 with the appropriate cam surface 12 or 13 and being permitted by virtue of the shaping or profiling of the apertures through which the rods 29, 33 and 34 pass, the sleeve elements 28 will be forced outwardly or rearwardly so that the compressive force on the springs 31 will be reduced due to the outward movement of the lock nut assemblies 30 whereby the force exerted by said springs 31 on the brake shoes 24 via the lugs or projections 25 will be reduced. This outward movement of the elements 28 will also result in a corresponding outward movement of the bridge pieces 32 which are attached thereto with a resultant compression of the springs 35, 36. Thus the reduction of the force exerted by the springs 31 will be counteracted to some extent by the action of the springs 35, 36 so that while there will be a reduction in the frictional engagement between the brake shoes and the drum the shoes will not actually be removed from contact with the latter. It will also be apparent that the springs 35, 36 will tend to urge the bridge pieces 32, the elements 28 and the operating lever back towards its initial or central position.

The mechanism above described is adapted to function in the following manner:

In the first place it will be appreciated that since the cam element 10 is fixed to the driving shaft any drive will be transmitted from the latter via said cam element and the operating levers 14 to the brake shoes 24, and thence by virtue of the frictional engagement between the latter and the drum 23, to said drum and the shaft 22. It will be recalled that the levers 14 are carried by a cage or carrier which is freely rotatable about the axes of the shafts 11 and 22 and is therefore able to rotate with the shafts.

With the driving shaft at rest the operating levers 14 will be in the central position shown in FIGURE 2 and the brake shoes 24 will, due to the action of the spring assemblies 26, be in full frictional engagement with the drum. On starting the resistance to motion of the driven shaft 22 will be at a maximum and such resistance will result in an angular displacement of the operating levers from their central positions shown in FIGURE 3 due to the action between the cam surfaces 12 and 13 and the ends of the arms 16. This angular movement of the operating levers 14 will as hereinbefore indicated result in a reduction of the force exerted by the springs 31 on the brake shoes 24 and hence in a reduction of the pressure of the shoes on the drum 23 and consequently in a reduction in the torque transmitted to the driven shaft 22 so that the latter will be subjected to a gradual acceleration. As the speed of the driven shaft 22 increases the operating levers 14 will move progressively towards their central or initial positions so that the pressure of the brake shoes 24 on the drum 23 will be progressively increased with a consequent progressive increase in the torque transmitted to the driven shaft 22. As the speed of the shaft 22 approaches and equals the speed of the driving shaft 11 the operating arms 14 will be restored to their initial or central position as shown in FIGURE 2 wherein the pressure exerted by the shoes 24 on the drum 23 will be restored to its maximum value and the torque transmitted to the shaft 24 will likewise attain a maximum value.

Conveniently means will be incorporated so that the mechanism may be set to give a predetermined minimum torque and for this purpose adjustable stop means e.g. a set screw or the like, may be provided in respect of each operating lever to limit the extent of displacement thereof from the central position under the action of the cam element.

A mechanism such as is indicated above will allow for smooth acceleration and retardation in both directions of rotation of the driving shaft and under all conditions of operation and while it is particularly applicable to drive units for imparting traverse motions to pulley blocks, cranes or the like it may nevertheless be applied to the drive unit of any equipment wherein it is necessary to arrange for smooth acceleration and retardation.

I claim:

1. A transmission mechanism for interposition between axially aligned driving and driven shafts comprising a friction clutch device including a drum drivingly coupled to the driven shaft and friction gripping means associated with the driving shaft and adapted frictionally to engage the drum and drive the same, means controlling the engagement between said gripping means and said drum such that the torque transmitted to the driven shaft will be a minimum upon initial rotation of the driving shaft and will progressively increase to a maximum as the speed of the driven shaft approaches that of the driving shaft whereby smooth acceleration of the driven shaft will be obtained, said friction gripping means comprising a pair of brake shoes urged resiliently into engagement with said drum, movable lever members controlling the position of the brake shoes in relation to the drum and a cam element associated with the driving shaft for moving the lever members to in turn control the brake shoes.

2. A transmission mechanism as in claim 1 in which the lever members each comprise a shaft portion and a radially directed arm, the shaft portion being supported for pivotal movement about an axis parallel to the driving shaft, the radially directed arm being adapted to cooperate with the cam element.

3. A transmission mechanism as in claim 2 wherein said lever members are two in number and the radially directed arms are aligned and extend in opposite directions, the cam element having two cam surfaces which are in diametrically opposed relation and with which the arms of the lever members are respectively adapted to cooperate.

4. A transmission mechanism as in claim 3 in which the shaft portion of each lever member is of generally rectangular form, two axially slidable elements in contact with the shaft portion of each lever in opposite faces thereof, resilient means associated with the slidable elements and urging the brake shoes into contact with the drum, said slidable elements being outwardly displaceable upon angular movement of the corresponding lever member to weaken the action of the resilient means against said brake shoes to reduce the force which the resilient means exerts on the brake shoes.

5. A transmission mechanism as in claim 4 in which said resilient means includes a spring, the mechanism further comprising a bridge piece slidably supported for movement with the slidable elements, a lug on the brake shoe, and a pair of springs acting on the bridge piece to urge the same towards the shaft portion of the associated lever member to resist outward displacement of the slidable members away from the shaft portion.

References Cited in the file of this patent

UNITED STATES PATENTS

| | | |
|---|---|---|
| 677,573 | Huber | July 2, 1901 |
| 857,970 | Wust-Kunz | June 25, 1907 |
| 1,453,202 | Stevens | Apr. 24, 1923 |
| 1,811,974 | Searle | June 30, 1931 |
| 2,050,613 | Kellog | Aug. 11, 1936 |
| 2,604,764 | Smith | July 29, 1952 |